(12) United States Patent
Greenberg et al.

(10) Patent No.: US 7,796,580 B1
(45) Date of Patent: *Sep. 14, 2010

(54) METHOD AND APPARATUS FOR ROUTING INFORMATION OVER OPTICAL AND ELECTRICAL PATHWAYS

(75) Inventors: Albert Gordon Greenberg, Summit, NJ (US); Gisli Hjalmtysson, Gillette, NJ (US); Jennifer Yates, Madison, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1030 days.

This patent is subject to a terminal disclaimer.

(21) Appl. No.: 11/214,329

(22) Filed: Aug. 29, 2005

Related U.S. Application Data

(63) Continuation of application No. 09/685,953, filed on Oct. 12, 2000, now Pat. No. 6,970,451.

(51) Int. Cl.
*H04J 3/14* (2006.01)
*H04J 1/16* (2006.01)
(52) U.S. Cl. .................. 370/352; 370/356; 370/342; 370/250; 370/254
(58) Field of Classification Search ............. None
See application file for complete search history.

(56) References Cited

U.S. PATENT DOCUMENTS

| | | | |
|---|---|---|---|
| 4,567,595 A * | 1/1986 | Hedlund | 714/800 |
| 5,884,017 A | 3/1999 | Fee | |
| 6,105,160 A * | 8/2000 | Fukumoto et al. | 714/776 |
| 6,141,326 A | 10/2000 | Minami | |
| 6,263,396 B1 * | 7/2001 | Cottle et al. | 710/263 |
| 6,393,478 B1 | 5/2002 | Bahlmann | |
| 6,452,934 B1 * | 9/2002 | Nakata | 370/428 |
| 6,535,927 B1 | 3/2003 | Kim | |
| 6,556,574 B1 | 4/2003 | Pearce | |
| 6,636,496 B1 | 10/2003 | Cho | |
| 6,680,922 B1 * | 1/2004 | Jorgensen | 370/328 |
| 6,714,549 B1 | 3/2004 | Phaltankar | |
| 6,763,190 B2 | 7/2004 | Agrawal et al. | |
| 6,765,906 B1 * | 7/2004 | Suzuki | 370/389 |
| 7,489,622 B2 * | 2/2009 | Sakoda et al. | 370/208 |

* cited by examiner

*Primary Examiner*—Ajit Patel

(57) ABSTRACT

A system and method of routing communication signals is provided. A first technique uses a packet switched device that operates using Internet Protocol, the packet switched device determines one or more commands based on a routing request to establish, maintain, restore or breakdown one or more communication paths and a circuit switched device that provides physical switching between a plurality of ports based on the one or more commands from the packet switched device. A second technique for expediting error condition information is also provided. As various error conditions are recognized, information relating to the error conditions is provided directly to the packet switched device to enable the packet switched device to restore communications with minimal delay.

17 Claims, 7 Drawing Sheets

METHOD AND APPARATUS FOR ROUTING INFORMATION OVER OPTICAL AND ELECTRICAL PATHWAYS

CROSS-REFERENCES TO RELATED APPLICATIONS

This application is a continuation of U.S. patent application Ser. No. 09/685,953, filed 12 Oct. 2000, now U.S. Pat. No. 6,970,451 by the same inventors and similarly titled.

BACKGROUND OF THE INVENTION

1. Field of Invention

This invention relates to routing information.

2. Description of Related Art

Current Wavelength Division Multiplexing (WDM) and Internet Protocol (IP) technologies provide capabilities that may be exploited for improved network operations. Existing circuit switched networks utilize semi-manual or centralized circuit allocation and standardized fail safe scenarios (exemplified by Synchronized Optical Network or SONET) to set up circuits for communications. Other networks use IP to forward packets, trusting that the messages will eventually reach their destination. Unfortunately, existing IP communications systems suffer from a number of inefficiencies such as providing relatively long delays and slow throughput after a communication is interrupted. New technology is needed to provide faster communication services.

SUMMARY OF THE INVENTION

The invention provides a method and apparatus for routing information. The smart router-simple optics (SRSO) approach concentrates intelligence for resource management in an Internet Protocol (IP) device; physical cross connections are then handled by a circuit switched device.

Thus, an exemplary SRSO router is constructed of multiple ports that are joined by optical cross connects and an IP router that provides IP functionality. The cross connection devices are only responsible for providing transmission services: signal regeneration, media access control (MAC) level framing, dynamic local optical connectivity, and physical transmission. The IP layer provides all complex functions: network optimization including traffic engineering and Quality of Service (QoS), management of optical resources (wavelength management), and restoration.

One exemplary embodiment overcomes the limitations of the known devices by having the IP device handle addressing, routing and the management of topology and network resources. The cross connection device then is concentrated on handling the capacity and reconfigurable optical cross connects. The IP layer can then control the cross connection layer for example, through the abstraction of IP tunneling.

Thus, the SRSO approach can be used to distribute the control of a circuit based network. Alternatively, the SRSO approach can be used to improve the efficiency of a packet based network by providing high bandwidth connections between communications nodes. The high bandwidth connections are reconfigured to provide bandwidth as required to efficiently manage packet service data.

Another exemplary embodiment corrects communications errors by attempting to correct the error within the communications node, attempting to correct the error by communicating with other communications nodes and communicating with the entire network.

BRIEF DESCRIPTION OF THE DRAWINGS

The invention will be described with reference to the following figures, wherein like numerals designate like elements and wherein.

DETAILED DESCRIPTION OF PREFERRED EMBODIMENTS

Figure 1:
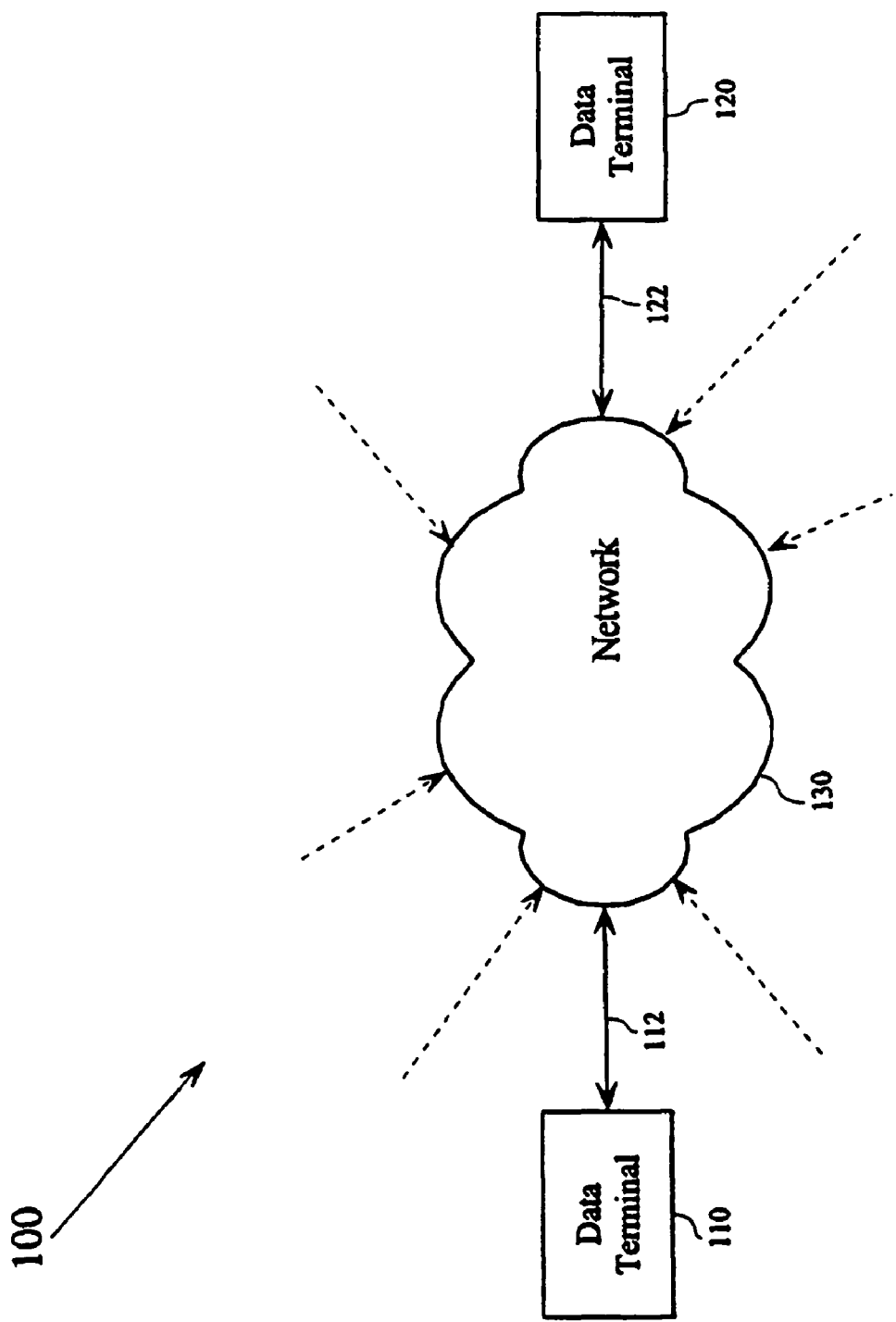
FIG. 1 is a block diagram of a network system.

FIG. 1 is a block diagram of an exemplary communication system 100. The communication system 100 includes a first data terminal 110 connected to a network 130 through a first data link 112, and a second data terminal 120 connected to the network 130 through a second data link 122. The network 130 can accommodate communication between the first data terminal 110 and the second data terminal 120 by providing an internal communication path capable of transmitting and receiving communication signals between links 112 and 122. Furthermore, the network 130 can self repair upon sensing a failure of the normal communication path within the network 130 by establishing a restoration communication path.

The data terminals 110 and 120 transmit/receive communication signals to/from the network 130 over their respective links 112 and 122. The data terminals 110 and 120 can be any one of a number of different types of data terminals, such as computers, routers, SONET terminals, ATM switches, cellular phones, satellites, storage devices, or any combination of software and hardware capable of generating, relaying and recalling from storage any information capable of being transmitted to the network 130. Furthermore, the data terminals 110 and 120 can be any number of different types of data receivers capable of receiving digital information such as digital computers, routers such as backbone routers, distribution routers and access routers, SONET terminals, ATM switches, cellular phones, satellites, storage mediums, transceivers, or any other known or later developed combination of hardware and software capable of receiving, relaying, storing, sensing or perceiving information transmitted from the network 130.

The links 112 and 122 can be any known or later developed device or system for connecting the data terminals 10 and 120 to the network 130. Such devices include direct serial/parallel cable connections, satellite links, wireless links, optical links, connections over a wide area network or a local area network, connections over an intranet, connections over the Internet or connections over any other distributed processing network or system. Additionally, the links 112 and 122 can be software devices linking various software systems. In general, the links 112 and 122 can be any known or later developed connected systems, computer programs or structures usable to connect the data terminals 110 and 120 to the network 130.

In operation, the data terminals 110 and 120 can provide various communication signals to each other. The various communication signals can contain various different types of information such as video information, audio information, web page information, digital files of various sizes and the like. To enable communication, the network 130 can form a communication path by receiving a request by one or both of the data terminals 110 and 120, reserving appropriate internal network resources and enabling the reserved resources to form an operational communication path.

However, during operations, communication paths within the network 130 can occasionally fail. Upon such failures, the network 130 can quickly self-repair by establishing new internal communication paths. The restoration process starts as the network 130 detects a problem using various fault detection devices (not shown) within the network. Upon detection of a problem, the network 130 reroutes communication from the failed internal communication path to a new communication path within the network 130, thereby restoring communication.

Figure 2:
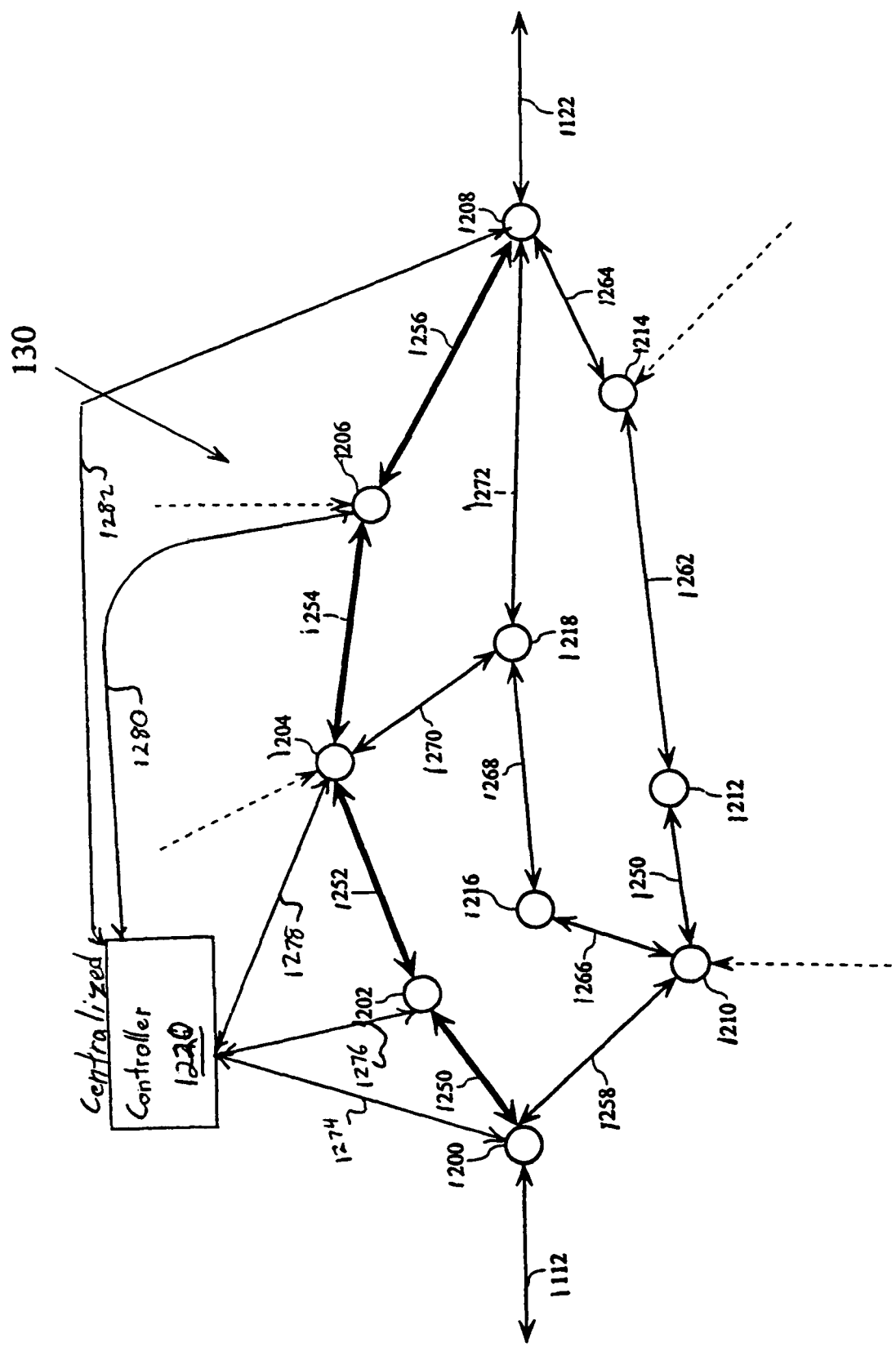
FIG. 2 is a block diagram of an exemplary portion of a network with a normal communication path established.

FIG. 2 is a block diagram of an exemplary circuit switched network 1130 having a set of communication nodes 1200-1218 interconnected through a series of transmission lines 1250-1272. The communication nodes 1200-1218 all communicate with and are controlled by centralized controller 1220 via links 1274-1282. The centralized controller 1220 sets up and reconfigures pathways within the network.

Thus, the network 1130 depends on route information being forwarded and handled by centralized controller 1220. The network 1130 therefore is constrained by the speed at which network controller 1220 can set up communications paths. In addition, the network 1130 is limited by the number of communications nodes that centralized controller 1220 can administer.

The network 1130 uses a "layered" hierarchy of subsystems with the highest layers relating to various tasks such as connectivity management and the lowest layers relating to the hardware that provides the physical conduits that carry various communication signals.

Connectivity management generally addresses the high level organization and monitoring of network resources. Connectivity management can include quality of service tasks, provisioning, packet routing and bandwidth reservation. Quality of Service (QOS) can include monitoring the time that a communication signal, or message, takes to reach a destination, and the number of communication signals that are lost in transit. Provisioning can include reserving bandwidth for future communications and enabling the internal pathways, when desired. Bandwidth reservation can include reserving certain wavelengths of light or certain portions of a circuit to accommodate a particular message.

Within the context of Internet communications, connectivity management is based on a communication standard known as Internet Protocol (IP) which "resides" on a number of intermediate and low-level layers, including a hardware layer composed of various communication pipes such as fiber-optic cables and the like, interconnected by special devices called routers.

Unfortunately, networks with multiple autonomous layers are subject to problems such as duplication of work and scheduling conflicts due to ill-coordinated distributed processing between different technology layers.

For example, each individual layer of a conventional IP communication system typically only communicates with the layers directly above or below, i.e., the highest layers are detached from the lowest layers. One effect of this organization is that an IP layer of a conventional IP communication system cannot directly access information relating to the health of an individual communication signal. As a result, substantial delays can result in an IP layer recognizing that individual communication signals are lost or corrupted.

Compounding this, complex escalation processes must be introduced to ensure that multiple layers do not simultaneously react to the same fault information. For example, long timeout periods are introduced into IP in the event of a failure to allow for restoration to occur in lower layer technologies.

However, by using a smart router simple optics (SRSO) approach, which concentrates resource management decision making and intelligence in the IP router, resource management is simplified, conflicts are eliminated and the optical switch controller is reduced to a simple set of command interpreters, or drivers, called an application programming interface (API).

Another benefit to the SRSO approach is that information from the lowest network layers can be easily provided to the IP and other high-level layers to enable the high-level layers to quickly restore lost or corrupted communication signals. For example, in a conventional IP environment, the health of a signal sent to a receiving terminal must be verified by either the receiving terminal or by the lowest network layers. If the signal is lost or corrupted in transit, the IP layer must be notified by the receiving terminal or indirectly through five or more other network layers that relay the information one layer to the next. Either process can take excessive amounts of time.

However, the SRSO approach enables various routers along a network communication path to monitor the communication signal in transit and enable the lowest network layers to directly inform the IP or other high-level layer of a lost or corrupted signal. The IP is then allowed to immediately reroute or otherwise restore the communication signal, achieving restored connectivity in substantially less time.

Table 1 below is a breakout of the different functions processed by the controller 1220 and by other network technologies. The various entries of Table 1 relate to different functions within a network, ranked generally from highest to lowest, and include: 1) connectivity management; 2) addressing; 3) traffic engineering; 4) connection management; and 5) physical switching.

TABLE 1

| Function | OXC | Centralized Controller | IP | ATM | POTS |
|---|---|---|---|---|---|
| Connectivity Management (Highest) | | X | | | |
| Quality of Service | | X | X | X | |
| Packet Forwarding | | | X | X | |
| Routing | | X | | X | X |
| Addressing | | X | X | X | |
| Traffic Engineering | | X | | X | X |
| Path Utilization | | X | | X | X |
| Path Capacity | | X | | X | X |
| Topology & Resource Discovery | | X | X | X | X |
| Provisioning | | X | | X | X |
| BandWidth reservation | | X | | X | X |
| Local Connection Management | | X | | | |
| Exception Handling | | X | X | | |
| Drop/Retransmitting | | X | X | | |
| Restoration | | X | X | | |
| Physical Switching | X | | | | |
| WDM/DWDM (Lowest) | X | | | | |

As shown in Table 1, the nodes (OXC) 1200-1218 have sole proprietorship of the lowest level services such as physical switching and local connection management. Physical switching, the lowest layer of layers, generally relates to controlling and monitoring a lower hardware layer (not shown) in a network to accommodate the physical transference of information from a first input port of a first MDM to a second output port of a second MDMs.

Also shown in Table 1, the controller 1220 and IP, ATM and Plain Old Telephone (POTS) controllers have concurrent control of several functions, including: addressing, traffic engineering and connection management. The first/lowest exemplary functions, can include both exception handling, retransmission of dropped or garbled of data and restoration of partially corrupted or lost information. The next set of intermediate functions, traffic engineering, generally relates to tracking the existence of a given path, path utilization, path capacity, topology and resource discovery. The third intermediate set of functions, addressing, relates to high level routing, i.e., determining, as opposed to implementing, an appropriate path for a particular optical signal or set of packets.

As discussed above, various drawbacks arise due to the distributed/overlapping processing shared between the controller 1220 and IP/ATM/POTS controllers, especially in light of the different policies and service objectives behind the various controllers. For example, because the controller 1220 and IP/ATM/POTS have concurrent control over addressing and traffic engineering, the controller 1200 and the nodes 1200-1218 can simultaneously determine two different restoration techniques to transfer a particular message. As a result, the controller 1220 must subsequently arbitrate as to which of the restoration techniques to use. Furthermore, having to independently determine connectivity (paths) at different layers can result in inefficient use of network resources.

Figure 3:
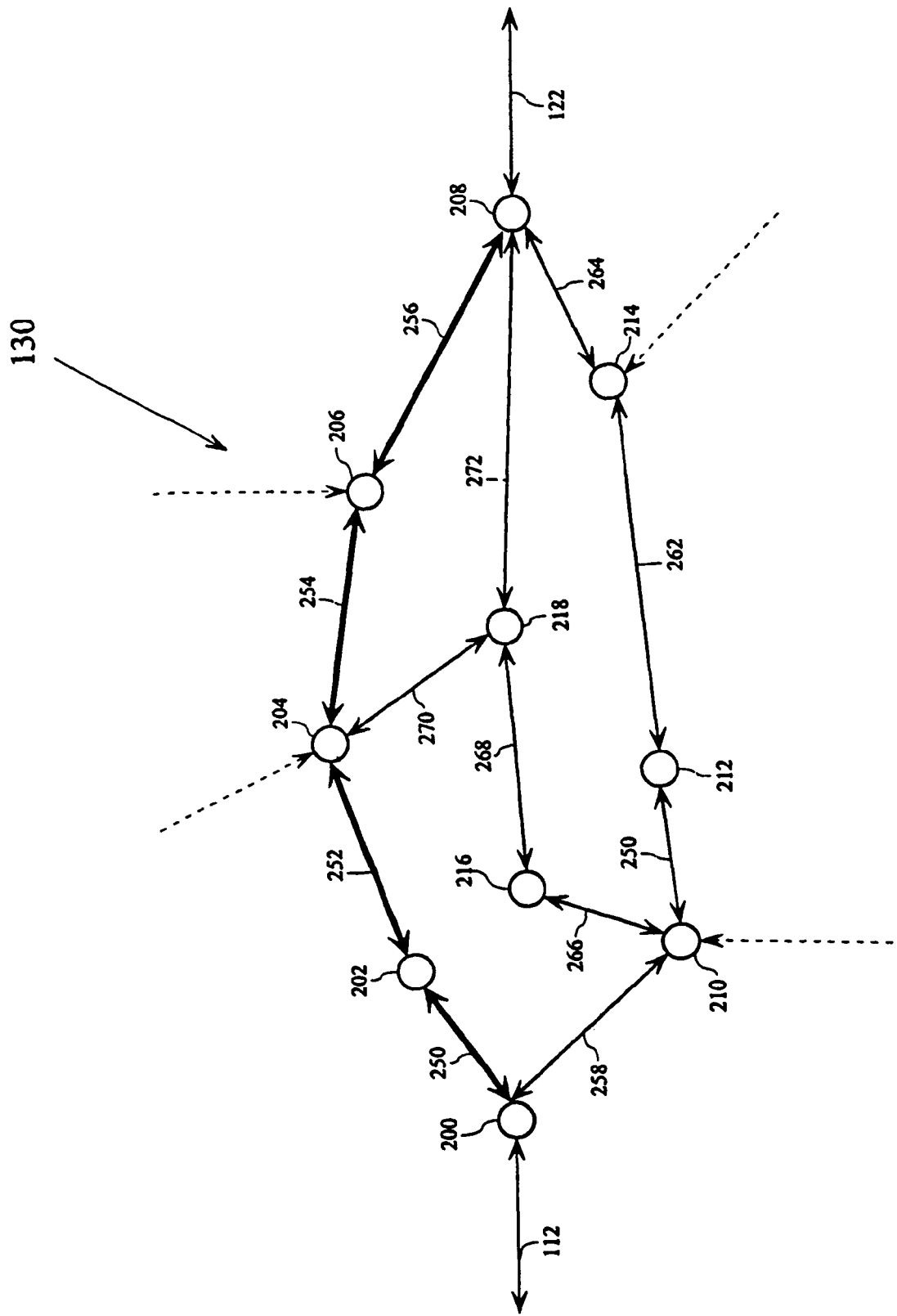
FIG. 3 is another block diagram of an exemplary portion of a network with a normal communication path established.

FIG. 3 is a block diagram of an exemplary network 130 having a set of communication nodes 200-218 interconnected through a series of transmission lines 250-272. While FIG. 3 depicts a network with ten communication nodes 200-218, it should be appreciated that the size of a network is not important and networks of any size can be used without departing from the spirit and scope of the present invention.

The communication nodes 200-218 of the exemplary network 130 are communications nodes having optical-cross-connect (OXC) devices and IP routers capable of passing communication traffic to/from other communication nodes 200-218 via transmission lines 250-272 and to locations external to the network 130. However, communication nodes 200-218 alternatively can be any one of a number of different types of data nodes, such as computers, routers, including backbone, access and distribution routers, SONET terminals, ATM switches, cellular phones, satellites, storage devices, or any other known or later developed combination of software and hardware capable of generating, relaying, recalling from storage/storing any information capable of being transmitted over the network 130.

Accordingly, transmission lines 250-272 can be any known or later developed device or system for connecting the various communication nodes 200-218. Such devices can include direct serial/parallel cable connections, satellite links, wireless links, optical links, connections over a wide area network or a local area network, connections over an intranet, connections over the Internet, connections over any other distributed processing network or system or any other known or later developed connected systems, computer programs or structures usable to connect the various nodes 200-218. However, for the example below, the transmission lines 250-272 are a combination of optical links carrying wavelength division multiplexed (WDM) and dense wavelength division multiplexed (DWDM) optical signals.

Furthermore, while the exemplary network 130 depicts the transmission lines 250-272 as single communication paths, it should be appreciated that each transmission line 250-272 can be a single optical fiber independently transmitting a large number of optical communication signals in the same direction or in opposite directions using a WDM or DWDM scheme, or the transmission lines 250-272 can be any number of independent optical fibers capable of transmitting large numbers of independent optical communication signals.

As shown in FIG. 3, communication nodes 200 and 208 are connected to links 112 and 122, respectively, making communication nodes 200 and 208 end nodes for the purpose of this example. These end nodes 200 and 208 can optionally transform outgoing optical communication signals to electrical signals suitable for transmission over links 112 and 122, and likewise can transform incoming electrical signals to optical signals suitable for transmission throughout the network 130.

In normal operation, network 130 can pass various communication signals across the network 130. The communication signals can be either unidirectional (one way) or bi-directional (two way) and be of various bandwidths. For example, a video feed could require a sustained single-direction high-speed internal path, a telephony link can require a sustained low-rate, bi-directional path and a series of web-page transfers can require a number of short-lived one-way paths.

Thus, the present invention provides a distributed approach for managing communication pathways. Each communications node has the ability to cooperate through IP protocols with other communications nodes to control the network. Each communications node cooperates with other communications nodes so the network effectively handles the communications traffic. The first communications node to receive a pathway setup request then selects a route through the network and sends requests to each node concerned. These nodes provide the desired connectivity where possible. Thus, the network can grow to any size necessary.

Communication paths are formed in the network 130 as a cooperative effort among the various nodes 200-218 in accordance with the Internet Protocol (IP) communication standard. As discussed above, the exemplary network has two functional areas. The first functional area of the exemplary network 130 consists of various hardware components including the communication nodes 200-218 and transmission lines 250-272. The second functional area includes an IP software/firmware device operating in the various communication nodes 200-218 to actively manage the topology of the network 130.

Thus, the IP software/firmware device has knowledge of the physical resources, and how they are being used. The IP software/firmware thus can allocate those resources in more advantageous ways and allow for faster error recovery.

Creating a communication path can start with the IP device receiving a transfer/routing request for a particular communication signal or receiving any other information relating to a routing request. Accordingly, the various communication nodes 200-218 will cooperate to transfer the communication signal by determining an appropriate communication path, scheduling and reserving the resources necessary to accommodate transfer of the communication signal and enabling the reserved resources.

The various communication nodes 200-218 can cooperate by each node sending out network topology and resource discovery signals. Topology and resource discovery is implemented using Internet Protocols (IP), Open Shortest Path first (OSPF), Border Gateway Protocol (BGP) or Intermediate Systems-Intermediate Systems signals (IS-IS) as are well known in the art. The network topology discovered can then be used in conjunction with other information about the physical status of the network to determine a route. The physical status of the network can include bandwidth currently in use or any other information known in the art.

For example, in order to pass information between links 112 and 122, one of the end nodes 200 or 208 can receive a routing request from one of the links 112 and 122. The receiving end node 200 or 208 can then determine an appropriate path through the networks and forward the routing request to the nodes. The various nodes 200-218 can then coordinate to determine a suitable path, reserve portions of their internal resources to enable the determined communication path and finally enable the reserved path to pass the requested information. The routing request can be forwarded using any known signaling scheme, such as signaling via IP packets, Resource Reservation Protocol (RSVP) and Constraint Based Routing-Label Distribution Protocol (CR-LDP).

In this example, links 112 and 122 are connected by a normal communication path (shown in bold) passing along communication nodes 200-202-204-206-208. End node 200 receives communication signals from a data terminal over link 112 and routes the communication signals directly to node 202 and indirectly to nodes 204, 206 and 208 where it is then passed to link 122. Likewise, end node 208 receives communication signals from a second data terminal over link 122 and routes the communication signals directly to node 206 and indirectly to nodes 204, 202 and 200 where it is then passed to link 112.

It should be appreciated that other communication signals can be simultaneously scheduled and transported across the network 130. For example, a remote telephone (not shown) associated with node 210 may need to communicate with a telephone network (not shown) associated with node 204. Accordingly, the network 130 can form a dedicated bi-directional path between nodes 204 and 210 by coordinating, scheduling, reserving and enabling the necessary resources to pass various telephony signals.

In order to coordinate resources and provide communication paths, the various communication nodes 200-218 transmit, relay and receive status information and commands to each other and perform various diagnostics. For example, node 200 can transmit information directly to node 202 and indirectly to nodes 204, 206 and 208 over a pre-designated optical frequency to discover network topology and resource states, to establish a communication path or to inform the other nodes 202-218 that node 200 detected a failure in a received communication signal.

A second function of the network is to self-diagnose various error conditions, including low-level and high-level error conditions, and to dynamically adjust the workings of the network accordingly.

The first type of error detection, i.e., low-level error detection, is provided using error detection circuitry in the nodes 200-218 that can diagnose the various hardware, and otherwise detect errors in communication signals as they are routed throughout the network 130. The types of error conditions that can be measured by the nodes 200-218 include detection of the presence of various laser carriers received from each transmission line 250-272 as well as errors incorporated within communication signals such as single bit errors, octet errors, cyclic redundancy check (CRC) errors, checksum errors, framing errors and loss of signal errors. However, as communication standards evolve and new standards develop, it should be appreciated that any error condition or failure capable of being measured can be used without departing from the spirit and scope of the present invention.

As every physical communication system can occasionally produce occasional errors, a determination can be made as to what kind of errors of any given class of errors is acceptable. For example, three or four single bit errors per second may be an acceptable error condition for some communication signals such as a video stream, yet a single bit-error may be unacceptable for other applications such as a web-file transfer. As different error conditions and failures can occur for various environments having different requirements, it should be appreciated that any measure of acceptable and unacceptable error conditions can be used as may be required by design.

As discussed above, as the various low-level error conditions are detected, the error conditions may be communicated to the IP layer. In various embodiments, low-level error conditions detected by the hardware of the various nodes 200-218 can directly provide information relating to the error conditions to the IP and other high-level layers without requiring handling by any intermediate layer. However, it should be appreciated that information relating to the various error conditions can alternatively be indirectly provided to the IP or other high-level layers indirectly through one or more intermediate layers as required by design.

In addition to low-level error detection, error conditions can be detected directly by the IP and/or other high-level layer. For example, each of the nodes 200-218 can determine whether the various transmission lines 250-272 and the other nodes are functional by periodically "pinging" the other nodes. A "ping" is any communication signal where a first device can detect the presence of a second device. Typically, "pings" are short communication signals containing little or no information, but still require a receiving device to send an acknowledgment signal to the "pinging" device. Alternatively, a "hello" that is not acknowledged by the receiving node can be used. Alternatively, messages can be sent independently from both ends. Patterns of lost or corrupted messages can be used to indicate a failure. Accordingly, a first device can verify the existence of a working second device as well as a functional bi-directional path by "pinging" the second device, or having the second device sending a periodic "hello".

The nodes of the exemplary network 130 ping each other during times just before and during periods when an active path connects the nodes. For example, to assure connectivity for the normal path 200-202-204-206-208, each of the normal path nodes 200-208 can ping their nearest neighbors along the normal path 200-202-204-206-208 just before the path is established and can further ping each other for the duration of the path's existence.

Alternative to the nearest neighbor approach, other connectivity approaches can be used including: (1) requiring each of the nodes 200-208 along the normal path 200-202-204-206-208 to ping all other normal path nodes 200-208; (2) requiring only each of the end nodes 200 and 208 to ping the other normal path nodes 202-208 or 200-206; or (3) requiring each of the end nodes 200 and 208 to ping only the other end node 200 or 208. Pings can occur between any two given nodes during regular network operation or the nodes can ping each other only during designated times.

The exemplary network 130 uses a nearest neighbor approach where each node pings its neighbors at a rate of 2,000 pings per second to provide failure detection in about 1000th of a second. However, it should be appreciated that the ping rate will be a design choice as required by the particular requirements of a given network.

In the event one of the communication nodes 202-208 or transmission lines 250-256 along the normal communication path fails or are otherwise determined to have an unacceptable error condition, the network 130 can self-repair by establishing restoration communication paths.

An exemplary method for restoring the network is that the communication node first attempts to correct the error within the communication node. Thus, if a laser failed within a communications node, the node may activate a backup laser, or switch the communications to a functioning but not currently in use laser alternately the communications node IP layer can send packets out on another interface, without changing any optical connectivity.

Next the communications node may attempt to correct the error by alerting those nodes that transmit significant data. Those nodes may be able to reroute either the information that is now being interrupted, or may allow the transmission of the data by rerouting other data such that communications resources are freed up.

Next the communications node may attempt to correct the error by sending a general alert to the entire communications network such that the network may reroute traffic around a failed pathway or node.

Figure 4:
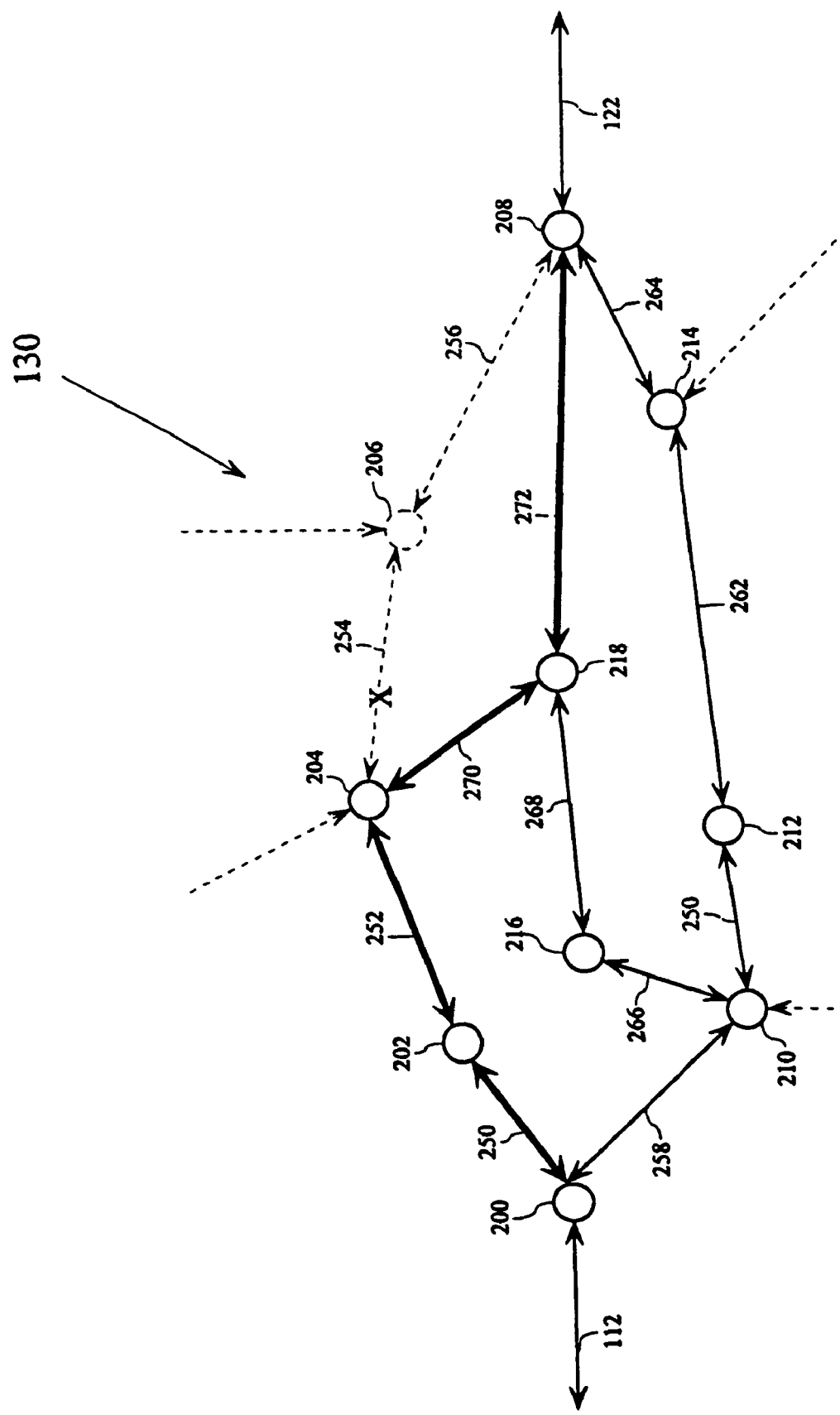
FIG. 4 is a block diagram of an exemplary portion of a network with a restoration communication path established.

FIG. 4 shows an example of the network 130 of FIG. 2 after a complete failure occurred on transmission line 254 of the normal communication path. If the failure is unidirectional, only the downstream nodes 206-208 receiving the failed signal can sense the loss of signal and can inform the nodes 200-202 of the failure. However, if the failure is bi-directional, the failure can be sensed by the hardware of all nodes 200-208 along the transmission path 200-202-204-206-208, and subsequently, any of the communication nodes 200-208 along the transmission path 200-202-204-206-208 can inform the other nodes of a failure. Furthermore, if the various nodes 200-218 along the normal path are pinging one another, the nodes can directly receive information relating to a high-level connectivity error condition.

Immediately upon directly or indirectly detecting a failure, an IP router in either node 204 or node 208 can perform restoration by redirecting traffic away from a failed element using either a pre-computed or post-computed alternate route. As shown in FIG. 3, a new communication path, or restoration path, between nodes 200 and 208 bypasses the failed link 254.

As with determining an initial communication path, determining a restoration path requires the IP software/firmware layer operating in the various nodes 200-218 to actively manage the connectivity of the network 130. Accordingly, during restoration, the various nodes 200-218 can coordinate to determine a suitable restoration path accounting for the failed transmission line 254 and any other error conditions, reserve portions of their internal resources to enable the determined restoration communication path and finally enable the reserved restoration path to reroute information.

As shown in FIG. 4, an exemplary restoration path can consist of nodes 200-202-204-218-208. However, as is evident in FIG. 4, the exemplary network 130 can create a variety of restoration paths. Accordingly, it should be appreciated that the restoration path can be determined based on the same criteria as the original communication path accounting for variables such as other existing traffic, bandwidth capacity of individual nodes, various error conditions and the like.

Figure 5:
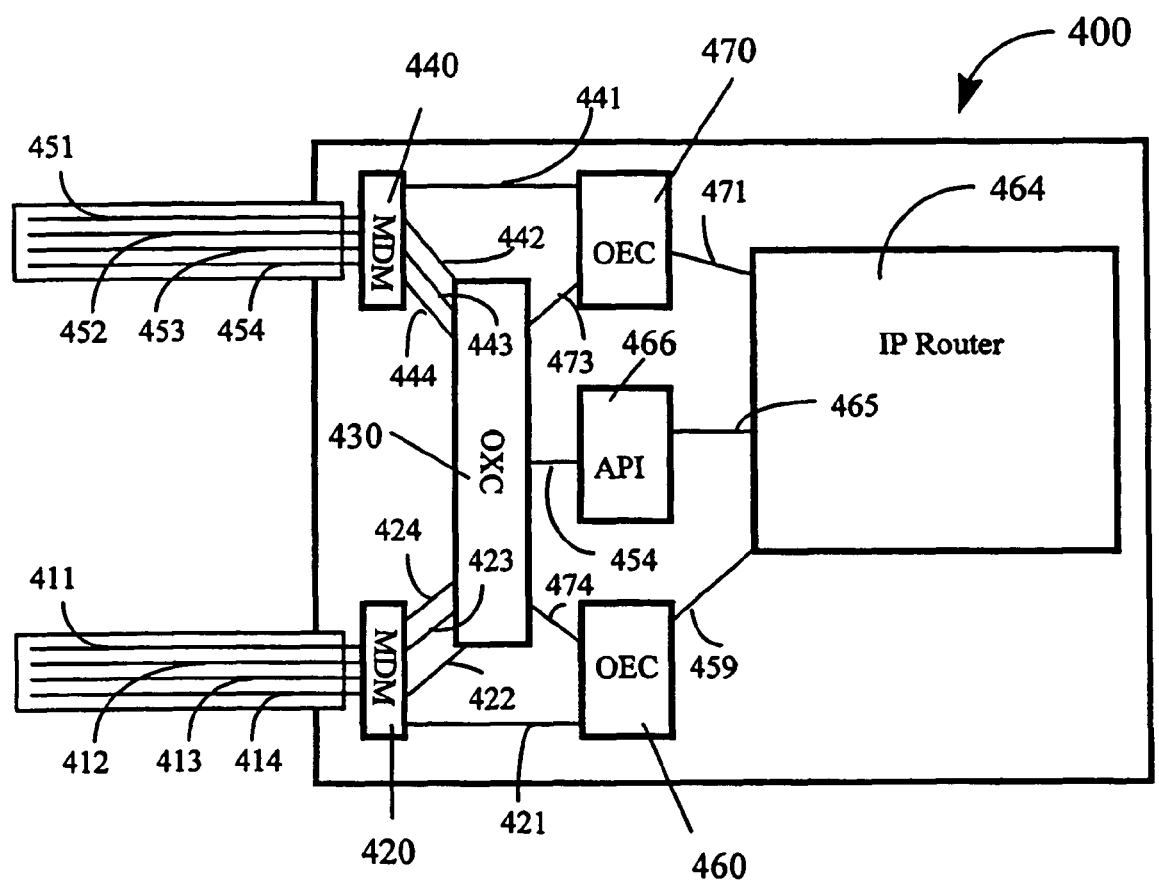
FIG. 5 is a block diagram of an exemplary router using an overlay system.

FIG. 5 shows a block diagram of an exemplary communications node 400 using a smart router simple optics (SRSO) approach. The communications node 400 includes an IP router 464, a first optical/electrical interface (OEC) 460, a second optical/electrical interface (OEC) 470, an application programming interface (API) 466, an optical-cross-connect switch (OXC) and a first and second multiplexer/de-multiplexers (MDM) 420 and 440. The first MDM 420 is connected to a first group of transmission lines 411-414 and the second MDM 440 is connected to a second group of transmission lines 451-454.

In operation the first and second MDMs 420 and 440 receive various types of signals. Some signals are directed to a respective OEC 460 or 470 via links 421 or 441. Other signals from the OECs 460 or 470 can provide the received signals to the various external transmission lines 411-414 or 451-454. Other information not passed between one of the OECs 460 or 470 can be passed to/from the OXC 430 via links 422-424 and 442-444.

The OXC can pass signals out to MDM 420 or 440 or the OECs 460 or 470. Thus control information can be passed on a dedicated wavelength as segregated by the MDMs 420 and 440, or control information can be passed on a service data wavelength for segregation by the OXC 430.

In various exemplary embodiments, the MDMs 420 and 440 are a collection of optical components. However, it should appreciated that the MDMs 420 and 440 can be any known or later developed device or system that can receive signals, including WDM optical signals, from transmission lines 411-414 and 451-454 and direct the signals to the OXC 430 and/or the OECs 460 and 470.

Accordingly, the exemplary transmission lines 411-414 and 451-454 can be single-mode optical fibers transmitting a number of WDM optical signals. However, it should be appreciated that the transmission lines 411-414 and 451-454 can be any known or later developed device or system that can transport signals to and from the various MDMs 420 and 440 such as a gigabit Ethernet device, an Asynchronous Transfer Mode device, a SONET Device and the like.

The OECs 460 and 470 can receive optical signals from the MDMs 420 and 440 or the OXC 430 via links 421 and 441, convert the optical signals to an electrical form, and pass the converted signals to the IP router 464 using links 459, 471 and 473. The OECs 460 and 470 can also receive electrical signals from the IP router 464 using links 459 and 471, convert the electrical signals to an optical form, and pass the converted signals to the MDMs 420 and 440 via links 421 and 441.

The exemplary links 421 and 441 are single-mode optical fibers transmitting a number of optical signals. However, it should also be appreciated that the links 421 and 441 can be any known or later developed device or system that can transfer signals, including WDM and DWDM optical signals, between the MDMs 420 and 440 and the OECs 460 and 470.

The IP router 464 can receive various communication signals such as routing requests, data files and data streams from the OECs 460 and 470. If a message/routing request relates to the IP protocol, the IP router 464 can determine appropriate paths to transfer information.

Upon reception of a signal, the IP router 464 can either transfer the files directly or determine an appropriate path in the OXC 430. For example, if the IP router 464 receives a request to transfer a file such as a web page from a first WDM channel $\lambda_1$ on transmission line 411 to a second WDM optical channel $\lambda_2$ on transmission line 451, the first MDM 420 can route the file data to the IP router 464 using the first OEC 460 and links 459 and 421. The IP router 464 can subsequently direct the second MDM 440 to receive the file using the second OEC 470 and links 441 and 471 and transmit the file to optical channel $\lambda_2$ on transmission line 451.

Alternatively, if the IP router 464 can direct the first MDM 420 to provide the first WDM channel $\lambda_1$ to the OXC 430, reserve and enable a path in the OXC 430 to provide a connection between the two MDMs 420 and 440, and direct the second WDM 440 to receive the appropriate signal from the OXC 430 and provide the signal to channel $\lambda_2$ to transmission line 451.

If the IP router 464 uses the OXC 430 to complete a connection, the IP router 464 first commands the MDMs 420 and 440 to route the communication signals to/from the transmission lines 411-414 or 451-454 and the OXC 430, and sends commands to the API 466 to configure the OXC 430 accordingly.

As discussed above, the API 466 is a basic set of drivers that can receive connection commands and configure the OXC accordingly. The API can exist either as part of the IP router 464 or as part of the OXC 430. For the example above, in order to transfer a signal on first WDM channel $\lambda_1$ on transmission line 411 to the second WDM channel $\lambda_2$ on transmission line 451, the API 466 can receive a command containing a number of arguments over links 463 or 465 relating to the source and destination channels, the required bandwidth, and various other arguments relating to safeguarding a reserved path and enabling interrupts. Once the API 466 receives the command, the API 466 can appropriately configure the OXC 430 using link 454 to receive a communication signal from one of the links 422-424 or 442-444 and provide the communication signal to one of the other links 422-424 or 442-444.

Besides executing commands, the exemplary API controller 466 can monitor the OXC 430 and pass various information such as communication signal status and the error conditions to the IP router 464. Status and error condition information can include information such as the presence or absence of a laser carrier signal on any given transmission line as well as status relating to communication signals received from the various transmission lines 411-414 or 451-454 such as single bit errors, octet errors, cyclic redundancy check (CRC) errors, checksum errors, framing errors and loss of signal errors. However, as discussed above, as communication standards evolve and new standards develop, it should be appreciated that any error condition or failure capable of being measured can be used without departing from the spirit and scope of the present invention.

The IP router 464 is microprocessor-based device having various peripheral devices. However, it should be appreciated that the IP router 464 can be any known or later developed combination of hardware and software that can receive and transmit communication signals from the OEC 460 and 470, issue commands to the API 466 and receive status and error condition information from API 466 such as a digital signal processor, a micro-controller, a combination of various logic circuits and discrete hardware, and the like.

The exemplary API 466, like the IP Router 464, is a microprocessor-based device having various peripheral devices. However, it should be appreciated that the exemplary API 466 can be any known or later developed combination of hardware and software that can receive commands from an IP or other controller and configure and monitor an OXC such as a digital signal processor, a combination of various logic circuits and discrete hardware and the like.

Accordingly, in various exemplary embodiments, the OXC 430 is a collection of optical and electrical components. However, it should appreciated that the OXC 430 can be any known or later developed device or system that can receive optical signals from the MDMs 420 and 440, redirect the optical signals under control of the API 466 and provide status and error condition information to the API 466.

Table 2 below is a breakout of the different tasks processed by the IP router 464 and the API 466. As with Table 1, Table 2 relate to the different layers within a network including: 1) connectivity management; 2) addressing; 3) traffic engineering; 4) connection management; and 5) physical switching. However, as shown in Table 2, the various layers are differently assigned between the various controllers 462, 464 and 466.

TABLE 2

| | |
|---|---|
| 1) Connectivity Management | (Highest) |
| Quality of Service | |
| Bandwidth reservation | |
| 2) Addressing | |
| Routing | |
| 3) Traffic Engineering | |
| Path Existence | IP |
| Path Utilization | |
| Path Capacity | |
| Topology & Resource Recovery | |
| 4) Connection Management | |
| Exception Handling | |
| Drop/Retransmitting | |
| Restoration | |
| 5) Physical Switching | OXC/API |
| WDM/DWDM | (Lowest) |

As shown in Table 2, the IP router 464 is responsible for all higher functions, including connection management, traffic engineering, addressing, and connectivity management. The IP router is responsible for all logical and physical resources. The API 466 and the OXC 430 are relegated to the physical switching tasks such as providing capacity, local dynamic connectivity and other transparent optical services for WDM and DWDM optical links.

One benefit of allocating tasks according to Table 2 is that the API 466 can be reduced to a simple set of command interpreters/drivers. Other benefits to concentrating decision making and intelligence in the IP router 464 include simplifying resource management, eliminating conflicts and enabling faster recognition of status and error condition information by an IP router. The benefits provided to users accordingly include faster connection and restoration speeds.

For example, during an initial connection, the IP router 464 can receive communication signals relating to a routing request for a particular communication signal and determine a viable communication path within the OXC 430 without the possibility of resolving conflicts that can arise when other decision-making devices make parallel decisions. Similarly, during a restoration operation, the IP router 464 is free to reroute communication signals without conflict.

Still another benefit is that, because more network layers are handled by a single controller, signals originating at the lower levels can be passed directly to the upper layers without requiring that the signals pass through intermediate levels. For example, status and error information provided by the physical switching layer can be directly accessed by the connectivity management layer, without requiring time-consuming handling by the addressing, traffic engineering and connection management layers.

Figure 6:
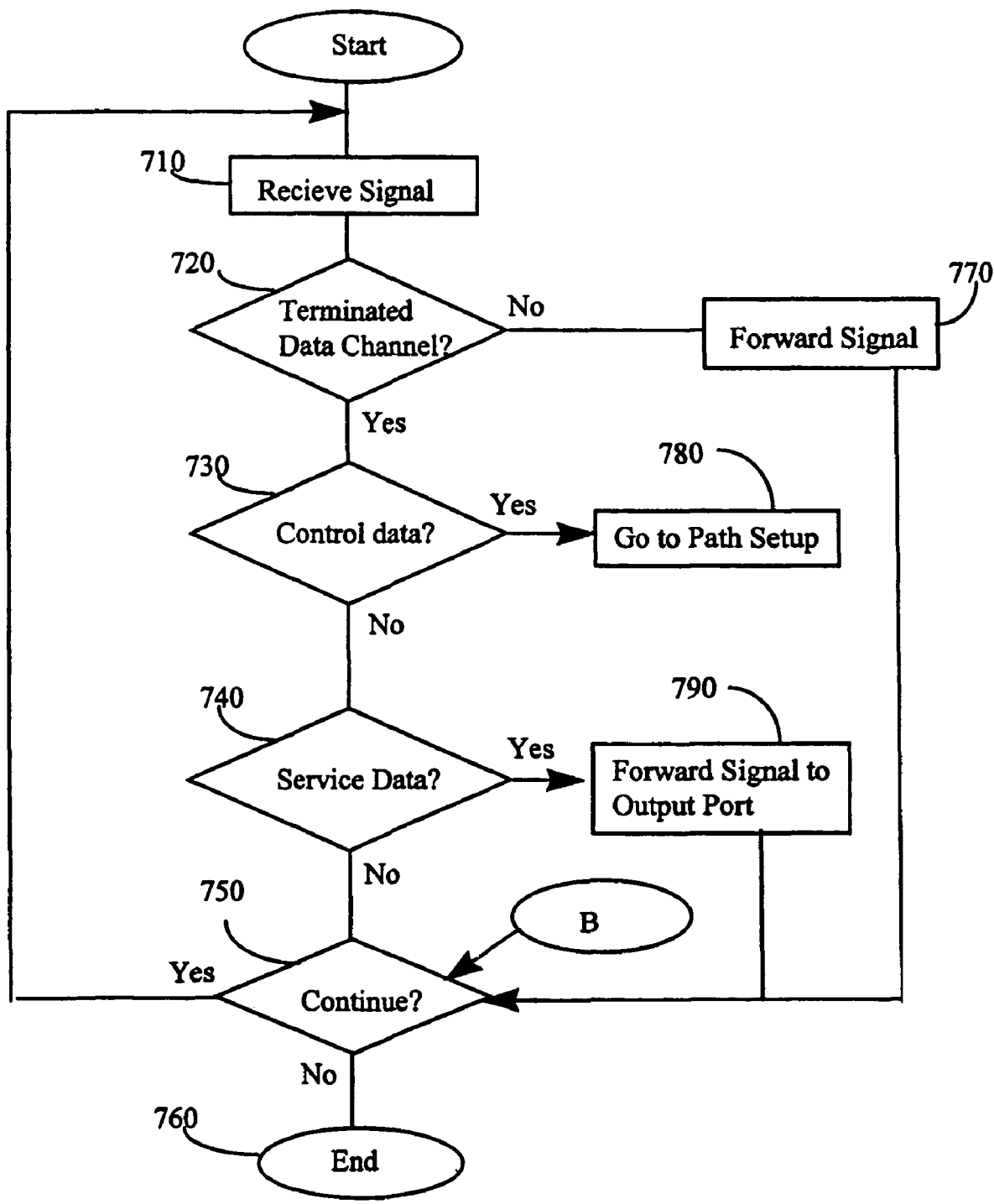
FIG. 6 is a flowchart illustrating an exemplary method of routing communication signals.

FIG. 6 is a flowchart outlining an exemplary method for forming communication paths in a network using a router having a circuit switched device and a packet switched device. The operation starts in step 710 where the communications node receives a communication signal. In step 720 a determination is made whether the signal arrived on a channel that is terminated at the IP router (packet switched device). If the signal arrived on a data channel terminated at the router, control continues to step 730. Otherwise control jumps to step 770.

In step 770 the signal is forwarded to the pre-designated output port without further interpretation. Thus, the method allows for rapid forwarding of information that does not require interpretation by the packet switched (IP router) device.

Next, in step 730, a determination is made as to whether the communication signal is a control signal to establish a communication path for a particular communication signal. If the message is not a control signal, control continues to step 740; otherwise, control jumps to step 780. In step 780 control jumps to step 800.

In step 740, a determination is made whether the data is service data. If the data is service data, control jumps to step 790. Otherwise control continues to step 750.

In step 750, a determination is made whether to continue. If the node is to continue, control jumps back to step 710 where the next communication signal is received; otherwise, control continues to step 760 where the operation stops.

Figure 7:
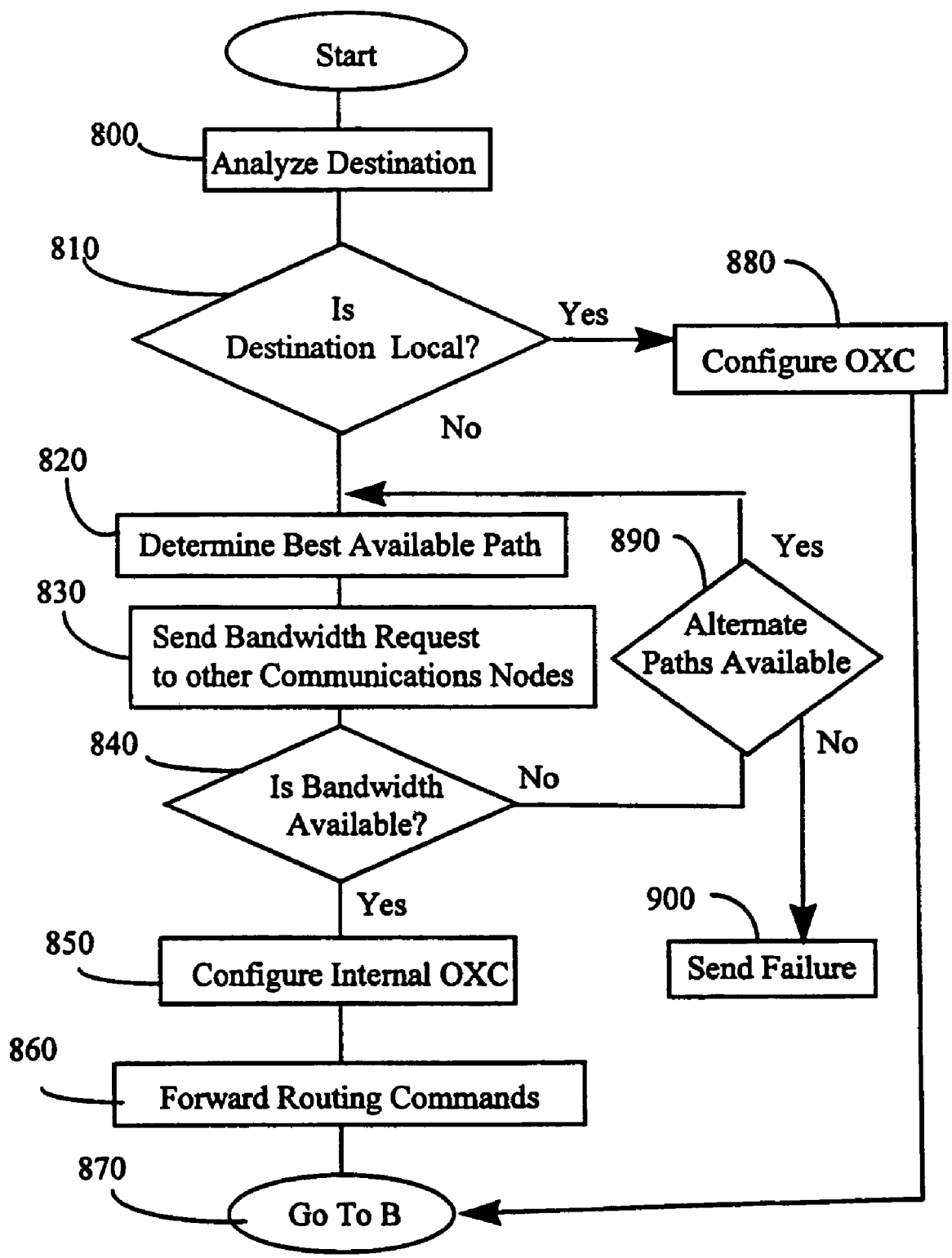
FIG. 7 is a flowchart illustrating an exemplary method of routing communication signals.

In FIG. 7, control starts at step 800. In step 800 the destination for the signal is analyzed. Control then continues to step 810.

In step 810, a determination is made whether the destination is local, or that the signal will not travel in the network. Therefore, since the signal will only be traveling within the communications node, no communications with other nodes is necessary. If the destination is local, control jumps to step 880, otherwise control continues to step 820.

In step 880, the OXC is configured to carry signals along the path requested by the first signal. Control then continues to step 870.

In step 820, a communication path is determined to pass the communication signal, including a path in the node's OXC. As discussed above, the exemplary operation uses an IP router that handles several different layers within a network, including: 1) connectivity management; 2) addressing; 3) traffic engineering; and 4) connection management. Control continues to step 830.

In step 850, the bandwidth requests are sent to downstream nodes. Control then continues to step 840.

In step 840, a determination is made whether the bandwidth is available through the entire network based on responses from other communication nodes. If the bandwidth is available, control continues to step 850, otherwise control jumps to step 890.

In step 890 a determination is made whether alternate paths are available within the network. If other paths are available, control jumps back to step 820, otherwise control continues to step 900. In step 900, request failure is sent.

In step 850, the internal communication node OXC is configured. Control continues to step 860.

In step 860, routing configuration commands are sent to the other communications nodes that will be involved in the path. Control then continues to step 870. In step 870 control jumps to B in FIG. 6.

As shown in FIG. 5, the systems and methods of this invention are preferably implemented on a digital signal processor (DSP) with various integrated electrical and optical circuits. However, the systems and methods can also be implemented using any combination of one or more general purpose computers, special purpose computers, programmed microprocessors or microcontrollers and peripheral integrated circuit elements, hardware electronic or logic circuits such as Application Specific Integrated Circuits (ASIC), discrete element circuits, programmable logic devices such as a PLD, PLA, FPGA, or PAL, or the like. In general, any device on which exists a finite state machine and/or various optical interfaces capable of implementing the various elements of FIG. 5 and the flowchart of FIGS. 6 and 7 can be used to implement the communications node functions.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A communications node, comprising:
   a circuit switched device that is configured to provide physical switching between a plurality of ports; and
   a packet switched device configured to:
     provide commands to control switching of the circuit switched device;
     receive notification of an error condition from the circuit switched device; and
     responsive to the notification of the error condition, issue instructions to the circuit switched device to handle the error condition.

2. The communications node of claim 1, wherein the packet switched device is configured to:
   receive Internet Protocol packets.

3. The communications node of claim 1, wherein the error condition is a pattern of lost or corrupted data.

4. The communications node of claim 1, wherein the circuit switched device is configured to transmit instructions to at least one other communications node to handle the error condition.

5. The communications node of claim 1, wherein the circuit switched device sends signals to determine the error condition responsive to instructions from the packet switched device.

6. The communications node of claim 1, wherein the packet switched device manages peer interfaces.

7. The communications node of claim 1, wherein the packet switched device manages external interfaces.

8. The communications node of claim 1, wherein the packet switched device manages internal resources.

9. The communications node of claim 1, wherein the packet switched device manages faults.

10. The communications node of claim 1, wherein the packet switched device manages internal faults at an edge of a network.

11. The communications node of claim 1, wherein the packet switched device uses a Border Gateway Protocol to discover a network topology.

12. The communications node of claim 1, wherein the packet switched device uses an Open Shortest Path First signal to discover a network topology.

13. The communications node of claim 1, wherein the packet switched device uses an Intermediate Systems-Intermediate Systems signal to discover a network topology.

14. The communications node of claim 1, wherein the packet switched device uses a network topology to determine a command.

15. The communications node of claim 1, wherein the packet switched device uses a bandwidth to determine a command.

16. The communications node of claim 1, wherein the packet switched device is configured to send a command to another communications node utilizing a Resource Reservation Protocol (RSVP).

17. The communications node of claim 1, wherein the packet switched device is configured to send a command to another communications node utilizing a Constraint Based Routing-Label Distribution Protocol (CR-LDP).

* * * * *